Sept. 7, 1937.  H. SCHÜZ  2,092,142
AUTOMATIC MACHINE TOOL CONTROL
Filed Jan. 7, 1936  4 Sheets-Sheet 1
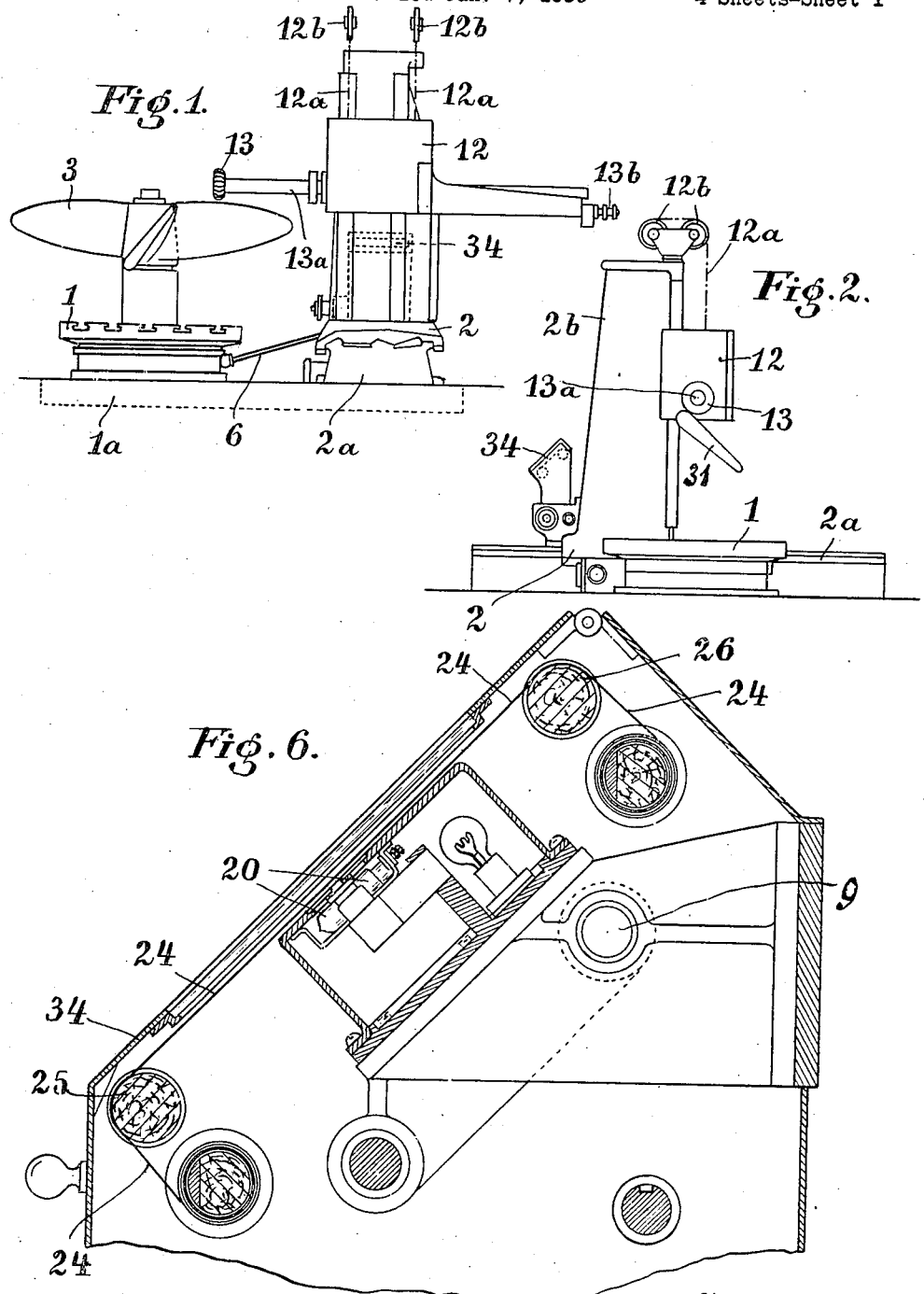
Inventor
Hans Schüz
by Karl Michaelis

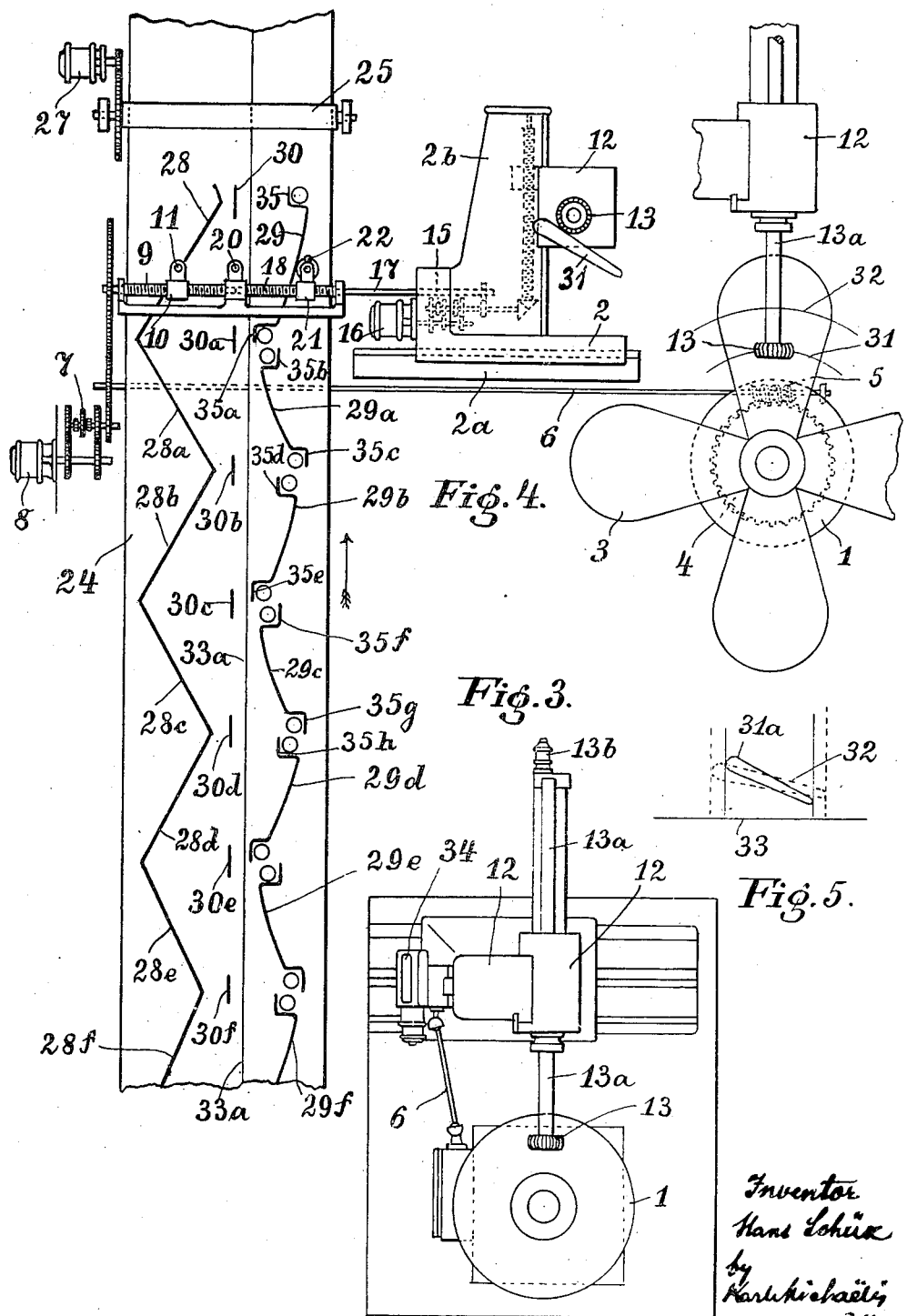

Sept. 7, 1937. H. SCHÜZ 2,092,142
AUTOMATIC MACHINE TOOL CONTROL
Filed Jan. 7, 1936  4 Sheets-Sheet 3

Inventor
Hans Schüz
by Karl Michaelis
atty.

Sept. 7, 1937.   H. SCHÜZ   2,092,142
AUTOMATIC MACHINE TOOL CONTROL
Filed Jan. 7, 1936   4 Sheets-Sheet 4
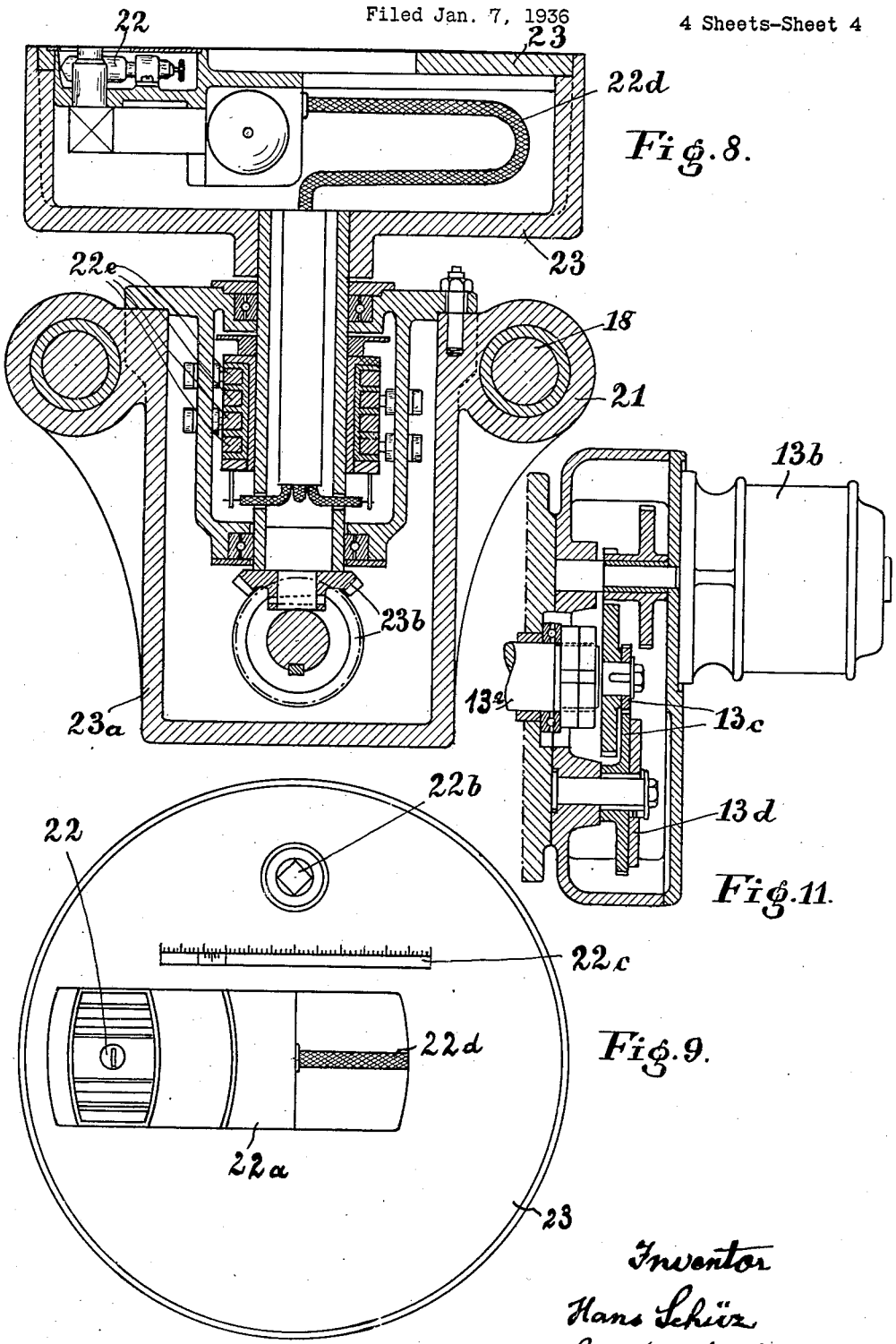

Patented Sept. 7, 1937

2,092,142

UNITED STATES PATENT OFFICE 2,092,142

AUTOMATIC MACHINE TOOL CONTROL

Hans Schüz, Offenbach-on-the-Main, Germany

Application January 7, 1936, Serial No. 57,874
In Germany February 12, 1934

5 Claims. (Cl. 90—13.4)

My invention relates to the machining and more especially to the milling of all kinds of work pieces in a purely automatic manner. It has particular reference to the combination, with a machine tool such as a milling machine, of means whereby the operation of this tool is governed with the aid of the electrical current in such a manner that the blank or workpiece is machined in an automatic manner exactly as required in each individual case.

In contradistinction to prior devices suggested for the same purpose the apparatus according to this invention does not rely for its automatic control and operation on a model of the object to be machined, but is governed by a drawing having the form of a so-called endless web, which travels in front of a plurality of photocells and by means of the lines, curves and marks provided thereon, which impart to the web a varying permeability for the light rays emitted by a source of light, induces variations in the circuit, in which these cells are inserted, which are transmitted onto the electric motor or motors driving the several parts of the machine tool, so that this latter acts on the blank exactly as required in order to produce the desired object.

As is well known to those skilled in the art, a photocell will allow a predetermined electric current to pass through whenever the cell is lighted. On the other hand, when the cell is not lighted, the current is interrupted immediately. If the circuit, in which the photocell is inserted, contains an ordinary relay, this relay may be caused, according to the manner in which it is connected, to either cut in the current feeding an electromotor or, if the motor is cut in, to cut it out at the desired point of time or also to reverse it so that the motor now operates in the opposite direction. It is thus possible to govern by means of a plurality of photocells the electromotors, which control all the movements of the tool, for instance the milling cutter, and the blank in such manner that by the mere screening action of the lines, curves and marks provided on the travelling web the blank is automatically machined as required in each individual case.

In the drawings affixed to this specification and forming part thereof, an apparatus embodying my invention is illustrated diagrammatically by way of example.

In the drawings

Fig. 1 is an end elevation of a horizontal milling machine with the work piece (a ship's propeller) mounted thereon.

Fig. 2 is a side elevation of the milling machine, with the workpiece removed.

Fig. 3 is a plan view corresponding to Fig. 2.

Fig. 4 is a purely diagrammatic showing of all the cooperating parts of the apparatus.

Fig. 5 is a diagram showing two developed cross sections of the blank to be machined.

Fig. 6 is a vertical section of the controlling apparatus proper and

Fig. 8 is an axial section of a rotary photocell and

Fig. 9 is a plan view corresponding to it.

Fig. 11 is a horizontal cross section.

Figure 10:
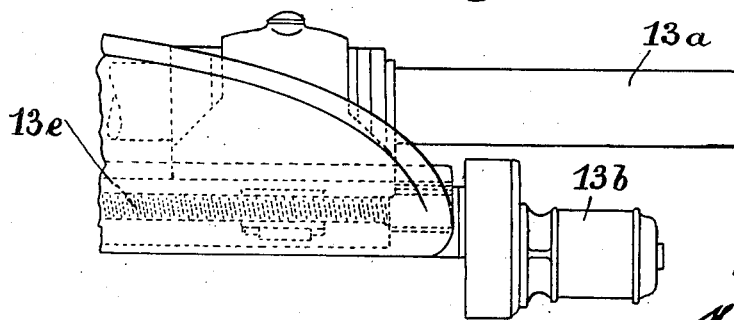
Fig. 10 illustrates the rear end of the means for driving the milling cutter shifting revice.

Referring to the drawings and first to Figs. 1 and 2, the machine tool to be here controlled is a horizontal milling machine, in which 1 is the machine table and 3 is the blank or workpiece (ship's propeller) mounted on the table. 1a is the support for the table, which is arranged laterally of the machine which is reciprocably mounted on the base plate 2a. The carriage 2 carries the upright 2b which supports the spindle carriage 12. The spindle carriage is arranged to be raised and lowered relative to the upright 2b by suitable mechanism. In the modification here disclosed the spindle carriage 12 is supported and moved by means of chains 12a running over guide sheaves 12b. The carriage 12 carries the spindle 13a of the milling cutter 13, this spindle being so mounted in the carriage 12 as to be capable of performing the required axial displacement. It is driven from an electromotor 13b (Figs. 9 and 10) by means of the change gear 13c which is controlled in the usual manner by a control disk 13d (Fig. 11). Directly behind the upright 2d is arranged the control desk 34 enclosing the travelling web 24, the means for feeding same and the photocells 11, 20 and 22, as will be described later on more in detail.

Obviously, when the blank 3 is continuously reciprocated, for instance in accordance with the horizontal width of the individual blade, and if the blank is raised and lowered in correspondence and the milling cutter 13 is shifted axially as required, the entire surface, to be produced, of the work piece will be formed, provided that the different members are governed in a corresponding manner.

The governing of these members is now effected in an altogether automatic manner by the cooperation of three photocells 11, 20 and 22 with the travelling web 24 and the lines 28, curves 29 and marks 30 appearing on it. In order to better explain the functioning of this combination the diagram of Fig. 4 shows the travelling web 24 and the photocells associated with it drawn to a comparatively large scale, while the milling machine itself and the blank are only drawn to a smaller scale, the connection between these parts being illustrated in a purely diagrammatic manner by a continuous shaft 6.

Figure 7:
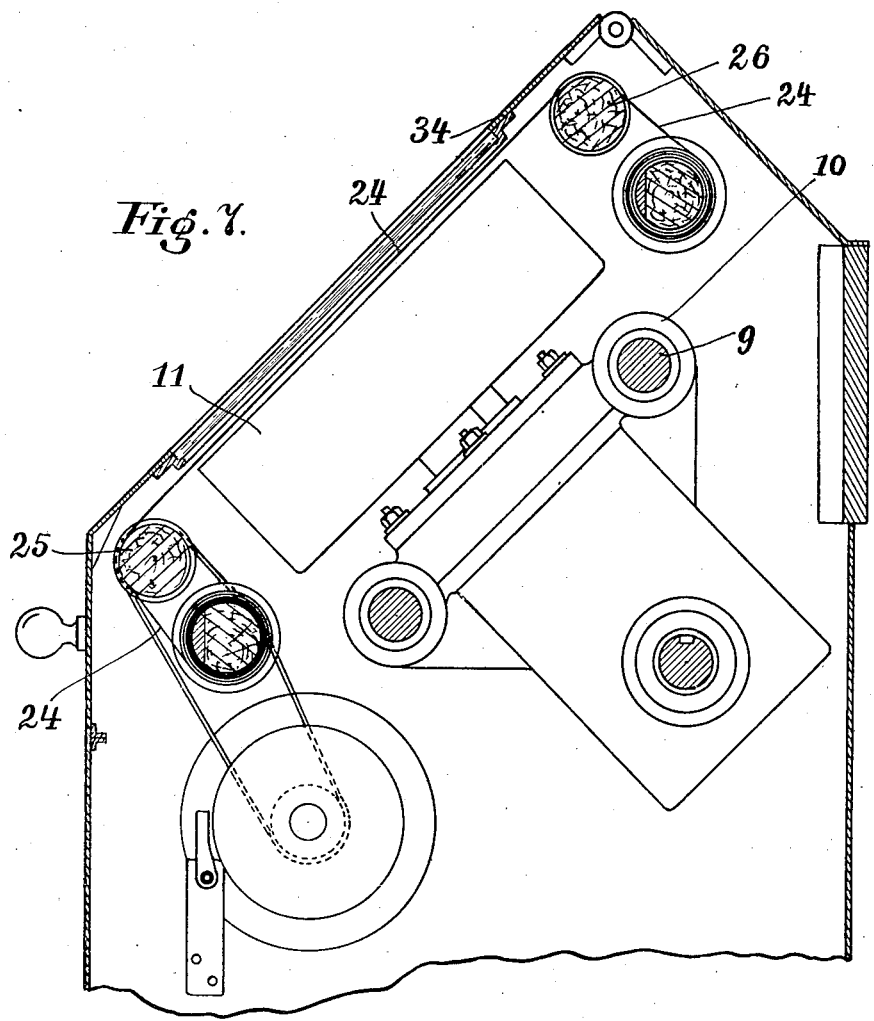
Fig. 7 is another vertical section of this apparatus extending in parallel to that shown in Fig. 6.

In the drawings the shaft 6 is assumed to drive the revolving table 1 with the aid of a worm 5 and worm wheel 4, both of which are arranged within the revolving table, the shaft itself being driven from an electromotor 8 with the aid of an electromagnetic reversing gear 7 which is arranged in a well known manner so as to alternatingly reverse the shaft 6 in one or the other sense by a corresponding electric impulse fed to a relay. If it be assumed that the paper web 24 be continuously fed in the direction of the arrow by a motor 27 and feed rollers 25, 26, or by some other means (Figs. 6 and 7), it will travel in front of the three photocells 11, 20 and 22. Cell 11 serves for governing the reciprocatory movement of the revolving table 1 and of the workpiece 3. To this end the cell 11 is arranged by means of a travelling nut 10 on a threaded shaft 9 (Fig. 7), which is revolved by the motor 8 by means of the electromagnetic reversing gear 7 in one or the other direction. This photocell 11 functions in the following manner:

Since together with the rotation of the threaded shaft 9 also shaft 6 rotates and the revolving table 1 is set revolving, this table together with the workpiece 3 will revolve very slowly in one sense, until a black line 28 on the travelling web 26 passes in front of the cell. Whenever this takes place, the passage of light from the source of light to the cell is interrupted and the cell becomes currentless. In consequence thereof the armature of the relay connected with this cell is released, whereby the reversing gear 7 is reversed again, whereby the threaded shaft 9 is also caused to revolve in the opposite sense, so as to shift the photocell 11 away from the line 28. However since the cell, being shifted in front of a transparent part of the paper web, will at once conduct the current, the electromagnetic reversing gear 7 will simultaneously reverse the driving gear for the cell, carrying it back into the position where it is screened by the black line 20a. In other words, the reversing gear cooperates with the photocell 11 in such manner as to compel it to strictly follow the line 28. This line 28 extends in zig-zag, its sections being marked 28a, 28b, 28c, 28d, 28e, 28f . . . and each of these section lines corresponds to a revolving movement of the revolving table 1 in one or the other sense.

Besides the lines 28 etc. there are arranged on the web the curves 29, 29a, 29b, 29c etc., which serve for governing the milling device as a whole in vertical direction. These curves are developed from vertical sections of the work piece 3 in the position of the point where the milling cutter acts on the workpiece, and since the workpiece revolves, these sections obviously appear as cylinder sections, their development being shown for two sections in Fig. 5. Here the sections 31, 32 are assumed as being intended to be developed vertically across part of the workpiece to be machined. To this end a section 31 and a section 32 are plotted at an axial distance from a base line 33, which corresponds to the line 33a on the web 24, in such manner that of the two halves of the curves 31a and 32a on the web, which are situated between the points of contact of the vertical tangents, one appears as the reflected image 29, the other as the real image 29a. These curves continuously alternate in a similar manner, always corresponding to the vertical cylinder sections appertaining to them.

These curves 29, 29a, 29b etc. on the web 24 control and govern the photocell 22. In order that this cell can consider the diameter of the milling cutter 13, it must be arranged for radial adjustment in such manner that it can be adapted to the diameter of the milling cutter 13, for otherwise it would be impossible for the photocell 22 to so govern the milling cutter 13 that its teeth would be imparted the current adjustment relative to the outer surface of the workpiece and could machine the current form. To provide for this adaptation of the cell 22 to the milling cutter, the cell 22, as shown in Fig. 8, is mounted on a revolving disk 23 for radial displacement. This displacement may be effected in any suitable manner, for instance, as shown in Fig. 8, by arranging the cell 22 in a small carriage 22a, which is guided in the disk 23 for radial movement, being displaceable by means of a set screw 22b. The extent of displacement can be read on a scale 22c. The disk 23 is rotatably supported in the casing 23a and the connection with the source of current (not shown) is effected by a cable 22d and sliding contacts 22e. By a suitably arranged electromotor and toothed gearing 23b the disk is rotated at a high speed independently from all other mechanisms. The casing 23a is connected by a travelling nut 21 to a threaded shaft 18 extending coaxially to, but independently from, the shaft 9 and driven by the shaft 17 with the aid of the coupling 15, which also causes the carriage 12 of the milling cutter spindle to be lifted and lowered.

During the revolution of the threaded shaft 18 the photocell 22 is reciprocated in a similar manner as described with reference to photocell 11. In so doing it follows the curves 29, 29a, 29b etc., which, as explained above, control the outer surface of the workpiece. However since in view of the thickness of the workpiece the curves 29, 29a, 29b, etc. do not merge directly to each other, it is necessary to provide, when passing from one curve (for instance 29) onto the adjoining curve (29a), that the photocell 22 is not left to itself and does not leave the prescribed path. In order to attain this, stopping lines 35, 35a, 35b etc. are provided at the ends of the curves, which stop the cell 22 during the advance of the web 24 and guide it into the next curve.

Instead of this one might also cut out the photocell 22 during this interval by interrupting the current supplied to it.

One may further provide on the web 24 at a level with these points of passage short lines 30, 30a, 30b, etc., which act on the photocell 20, while it is at rest and actuate a relay which in its turn acts on the photocell 22 in such manner that the cell is always reversed at the curves 29a, 29c, etc. The principal task allotted to the marks 30, 30a, 30b, etc. consists therein that each alternate mark (for instance 30, 30b, 30d, etc.) actuates by means of the photocell 20, while it is at rest (see also Fig. 6) through a relay the advance spindle 13e shown in dotted lines in Fig. 10 which serves to advance the milling cutter spindle 13a and milling cutter 13 in such manner that the cutter 13 is advanced correspondingly.

As can be guessed from the above explanation, all those movements which are required for the machining of the workpiece 3, are controlled and governed by the three photocells 11, 20 and 22. The electromotors serving for driving the several members are of the usual well known kind and are fed with heavy current of any suitable character. As already mentioned above, the cutting in and out of the motor current is effected by means of ordinary relays of well known construction, in which an electromagnet, which is operated directly or indirectly by the current of the respective photocell, acts on an armature which either closes or interrupts the motor current. Equally the electromagnetic clutches and reversing gears are of a well known kind.

The essence of this invention consists therein that a continuously travelling translucent web of paper or the like controls, by means of lines, curves and marks provided thereon, three photocells which now govern the several members of the milling machine in such manner that the milling cutter automatically machines the workpiece in the desired manner.

Obviously the machine table 1 need not be revolved in one and the other direction, but after having once been adjusted, may remain at rest, and in this case the carriage 2 together with the machine structure 2b and the spindle carriage 12 is reciprocated by the motor 16 on the machine bed 2a in a corresponding manner, these movements being controlled and brought about by the lines 28, 28a, etc. in the same manner as heretofore described, while the worm gear 5 is disengaged.

I wish it to be understood that I do not desire to be limited to the exact details of construction shown and described for obvious modifications will occur to a person skilled in the art.

I claim:—

1. A system of automatic milling machine control comprising in combination, a milling machine, a milling cutter arranged on said machine for revolution, a movable workpiece carrier and electric means for actuating said cutter and said workpiece carrier, a plurality of photo cells electrically connected with said electric actuating means, one of said cells being reciprocable, another cell being mounted for revolution about and for radial adjustment relative to a centre point, a third cell being stationary, a shaft arranged to rotate said workpiece carrier, a motor arranged to drive said shaft, an electromagnetic reversing gear inserted between said motor and said shaft and arranged to be influenced by said reciprocable cell, a threaded shaft coupled with said reversing gear and coupled with said reciprocable and said revoluble photo cells, another threaded shaft coupled with said revoluble cell, another electromagnetic coupling inserted between and operatively connecting said other threaded shaft with said milling cutter, a web of translucent material, means for moving said web longitudinally past said cells and marks on said web corresponding in form and position to consecutive phases of operation of said cutter and said workpiece carrier, the translucency of said marks differing from that of said web so as to vary the illumination and operative conditions of said cells so as to influence in a predetermined manner the operation of said reversing gears to control the movements of said workpiece carrier and of said milling cutter, respectively.

2. A system of automatic milling machine control comprising in combination, a milling machine, a milling cutter arranged on said machine for revolution, a movable workpiece carrier and electric means for actuating said cutter and said workpiece carrier, a plurality of photo cells electrically connected with said electric actuating means, one of said cells being reciprocable, another cell being mounted for revolution about and for radial adjustment relative to a centre point, a third cell being stationary, a shaft arranged to rotate said workpiece carrier, a motor arranged to drive said shaft, an electromagnetic reversing gear inserted between said motor and said shaft and arranged to be influenced by said reciprocable cell, a threaded shaft coupled with said reversing gear and coupled with said reciprocable and said revoluble photo cells, another threaded shaft coupled with said revoluble cell, another electromagnetic coupling inserted between and operatively connecting said other threaded shaft with said milling cutter, a web of translucent material, means for moving said web longitudinally past said cells and three rows of marks on said web corresponding in form and position to consecutive phases of operation of said cutter and said workpiece carrier, the translucency of said marks differing from that of said web so as to vary the illumination and operative conditions of said cells so as to influence in a predetermined manner the operation of said reversing gears to control the movements of said workpiece carrier and of said milling cutter, respectively.

3. In a system of automatic milling machine control in combination, a milling machine, a milling cutter and a movable workpiece carrier associated with said machine, electrical means for actuating said cutter and said carrier, two movable photocells arranged for cooperation and electrically connected with said electrical actuating means, electromagnetic means arranged to govern the movements of said workpiece carrier and to be influenced by one of said cells, means operatively connected with the other cell for displacing said cutter relative to said workpiece carrier, means for feeding said cutter towards and away from said carrier, and a web of translucent material, means for moving said web longitudinally past said cells and marks on said web corresponding in form and position to consecutive phases of operation of said cutter and said workpiece carrier, the translucency of said marks differing from that of said web so as to vary the illumination and operative conditions of said cells so as to influence in a predetermined manner the operation of said electric moving means and of said machine tool.

4. In a system of automatic milling machine control in combination, a milling machine, a milling cutter and a movable workpiece carrier associated with said machine, electrical means for actuating said cutter and said carrier, two movable photocells arranged for cooperation and electrically connected with said electrical actuating means, the first cell being reciprocably arranged, a second cell being mounted for revolution about and for radial adjustment relative to a centre point, and a third cell which is stationary, electromagnetic means arranged to govern the movements of said workpiece carrier and to be influenced by said first cell, means operatively connected with said second cell for displacing said cutter relative to said workpiece carrier, means for feeding said cutter towards and away from said carrier, said third cell being arranged to influence the direction of travel of said second cell and the operation of said cutter feeding means, and a web of translucent material, means for moving said web longitudinally past said cells and marks on said web corresponding in form and position to consecutive phases of operation of said cutter and said workpiece carrier, the translucency of said marks differing from that of said web so as to vary the illumination and operative conditions of said cells so as to influence in a predetermined manner the operation of said electric moving means and of said machine tool.

5. In a system of automatic milling machine control in combination, a milling machine, a milling cutter and a movable workpiece carrier associated with said machine, electrical means for actuating said cutter and said carrier, two movable photo cells arranged for cooperation and electrically connected with said electrical actuating means, the first cell being reciprocably arranged, a second cell being mounted for revolution about and for radial adjustment relative to a centre point, and a third cell which is stationary, electromagnetic means arranged to govern the movements of said workpiece carrier and to be influenced by said first cell, means operatively connected with said second cell for displacing said cutter relative to said workpiece carrier, means for feeding said cutter towards and away from said carrier, said third cell being arranged to influence the direction of travel of said second cell and the operation of said cutter feeding means, and a film bearing marks corresponding in form and position to consecutive phases of operations of said cutter and said workpiece carrier and means for moving said film longitudinally past said cells.

HANS SCHÜZ.